United States Patent

[11] 3,624,082

| [72] | Inventors | Morton Lewis |
| | | Skokie; |
| | | Thomas W. Findley, La Grange, both of Ill. |
| [21] | Appl. No. | 553,019 |
| [22] | Filed | May 26, 1966 |
| [45] | Patented | Nov. 30, 1971 |
| [73] | Assignee | Swift & Company |
| | | Chicago, Ill. |

[54] PROCESS FOR MAKING 2-HYDROXY-3-ALKOXY QUATERNARY AMMONIUM PROPANE SALTS
8 Claims, No Drawings

[52] U.S. Cl............................................... 260/247.7 A,
260/268 R, 260/286 Q, 260/297 R, 260/326.5
N, 260/567.6 M
[51] Int. Cl............................................. C07d 87/32
[50] Field of Search............................ 260/247.7,
567.6, 268 R, 286 Q, 297 R, 326.5 N

[56] References Cited
UNITED STATES PATENTS

| 2,680,769 | 6/1954 | Tesoro et al. ................ | 260/567.6 |
| 2,946,797 | 7/1960 | Rudner......................... | 260/286 |
| 2,548,679 | 4/1951 | Olin............................. | 260/567.6 |
| 3,326,927 | 6/1967 | Aamoth........................ | 260/297 |
| 3,412,160 | 11/1968 | Schierholt .................... | 260/637 |
| 2,775,604 | 12/1956 | Zech ............................ | 260/404.5 |

*Primary Examiner*—Alex Mazel
*Assistant Examiner*—Jose Tovar
*Attorneys*—Edward T. McCabe and W. C. Davis

ABSTRACT: Quaternary ammonium salts are produced in substantial yields within a reasonable time by reacting, in the presence of water, a tertiary amine and 1-halo, 2-hydroxy, 3-alkoxy propane or by reacting the corresponding tertiary amine hydrohalide and glycidyl ether. The compositions possess surfactant properties and can be used as emulsifying agents, germicides, etc.

PROCESS FOR MAKING 2-HYDROXY-3-ALKOXY QUATERNARY AMMONIUM PROPANE SALTS

The invention relates to a new class of quaternary ammonium salts and to a method for preparing quaternary ammonium salts. More particularly the method relates to the preparation of quaternary ammonium salts by reacting tertiary amines or derivatives thereof and substituted propanes wherein the terminal position is substituted with a fatty alkoxy group.

The products of the invention have outstanding properties as surface active agents because of a uniquely low surface tension in water. Another desirable characteristic is the very low interfacial tension they exhibit at certain interfaces, such as water-benzene and water-hexane interfaces, which makes them excellent emulsifying agents. Despite these desirable properties, a major obstacle to preparation and commercial usage of these quaternary amines has been the previously known slow and impurity-producing reaction processes for making quaternary ammonium salts. Prior art methods of making 2-hydroxy-3-alkoxy propyl ammonium salts have required long reaction times and have resulted in the production of large quantities of undesirable byproducts. Indeed, it has been impossible to obtain a satisfactory reaction rate or product yield using a fatty alkoxy substituted reactant.

It is therefore an object of this invention to provide new quaternary ammonium salts.

A further object of this invention is to provide an improved method for producing quaternary ammonium salts including a 2-hydroxy, 3-alkoxy propyl group.

Another object of the invention is the provision of a rapid method for reacting a tertiary amine and a 1-halo, 2-hydroxy, 3-alkoxy propane to form a quaternary ammonium salt.

Another object of the invention is the provision of a method for making quaternary ammonium salts by reacting a tertiary amine hydrohalide and a glycidyl ether.

Additional objects will be readily apparent to those skilled in the art from the detailed description of the invention which follows.

Generally, the invention involves the discovery that quaternary ammonium salts may advantageously be produced by reacting in the liquid phase, in the presence of water, tertiary amines and 1-halo, 2-hydroxy, 3-alkoxy propanes or by reacting tertiary amine hydrohalides and glycidyl ethers. The water is absolutely necessary for the reaction, for without the presence of water, little or no quaternary salt is produced. The method makes possible the synthesis of new quaternary salts wherein the quaternized nitrogen atom has a 2-hydroxy, 3-alkoxy propyl radical attached thereto.

More particularly, the method of the invention involves the production of quaternary ammonium salts characterized by the groupings

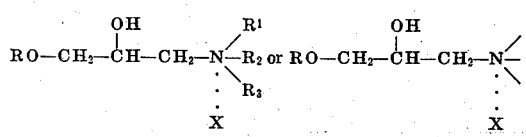

wherein R is a fatty chain containing eight to 18 carbons, R$^1$ is a C$_8$–C$_{18}$ alkyl radical and R$^2$ and R$^3$ are C$_1$–C$_{18}$ alkyl radicals, X is a halogen and

is part of a saturated or unsaturated, five or six member heterocyclic ring wherein the ring contains carbon, and may include oxygen or sulfur. The heterocyclic ring may be substituted with alkyl groups, preferably of one to eight carbons. Further, the carbons of said heterocyclic ring may also be part of another ring system. A tertiary amine and the condensation product of a fatty alcohol and an epihalohydrin may be reacted in an aqueous environment to form the quaternary salt. Alternatively, a tertiary amine hydrohalide may be reacted with a glycidyl ether. The reaction conditions for the alternate reaction correspond to the reaction of the tertiary amine and substituted propane. Preferably the quaternization reaction is conducted within a definite temperature range and with constant agitation. Refluxing of the reaction mass provides a convenient method of maintaining a uniform temperature throughout the reaction mixture. The inventive method provides for rapid reaction rate and substantial completion of the reaction may occur within 4 hours.

The halogen-substituted propane used as a reactant in the instant method may be synthesized by condensing a fatty alcohol with an epihalohydrin using stannic chloride as a catalyst. The product is a 1-halo, 2-hydroxy, 3-alkoxy propane. This condensation reaction is described in U.S. Pat. No. 2,327,053. The alkoxy groups which are derived from a fatty alcohol may vary in length from eight to 18 carbon atoms. Use of a substituted propane derived from a mixture of long chain alcohols is also contemplated, for instance a mixture of C$_{16}$ and C$_{18}$ fatty alcohols obtained from tallow or a mixture of C$_{10}$ to C$_{14}$ fatty alcohols obtained from coconut oil. The halide substituent may be a chloride, bromide or iodide.

The amine reactant may in general by any tertiary amine. All trialkyl amines of small chain length, one to four carbon atoms, produce quaternary salts exhibiting good surface activity. Especially effective are amines wherein one of the alkyl chains is from eight to 18 carbon atoms. Alkyl dimethyl amines wherein the alkyl group contains five to 22 carbon atoms, such as docecyl, tetradecyl, hexadecyl or hydrogenated tallow, also produce interesting surface active products. Also contemplated as the amine reactant are benzyl amines and heterocyclic tertiary amines such as pyridine and N-alkyl, N-morpholines and ditertiary amines such as substituted piperazines and tetralkyl alkylene diamines.

Glycidyl ethers corresponding to the above-described substituted propanes are utilized in the alternate method of synthesis of the quaternary ammonium salt. These glycidyl ethers are characterized by the structure

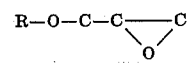

wherein R is a carbon fatty chain having about eight to 18 carbons. Mixtures of n-alkyl glycidyl ethers are available commercially.

The amine hydrohalide reactant suitable in the alternate method may be obtained by reacting a tertiary amine and a hydrogen halide. Amine hydrohalides which have utility include those derived from trialkyl amines, heterocyclic tertiary amines such as pyridine and N-methyl morpholine and ditertiary amines such as substituted piperazines and tetramethylethylene diamine.

Water must be present in the reaction system, for without water an amine hydrohalide and a glycidyl ether are believed to be formed and/or remain unreactive and little or none of the quaternary ammonium salt is formed. Evidently the water acts as a solvent to dissolve the amine hydrohalide. The amount of water present in the reaction system should therefore be sufficient to dissolve any tertiary amine hydrohalide which may be present. Generally from 15 to 100 percent of water based on total solvent produces satisfactory results with 75 to 90 percent of solvent preferred because it gives a better product in a shorter reaction time while still keeping viscosity within acceptable limits. It is sometimes preferable to intermittently add water during the reaction.

The amount of solvent or "total solvent" employed in the process is such that the water content usually approximates at least about 15 percent by weight based on the reactants (amine-halide mixture). Larger amounts of about 50-200 percent water based upon the total reactants is preferred. STill greater amounts can be used but usually the benefit derived from the use of larger water-reactant ratios is not commensurate with the added cost.

It has been found desirable, due to the physical mechanics involved in heating and stirring the liquid reaction mass, to add a viscosity-reducing agent such as isopropyl alcohol. The alcohol prevents undue viscosity buildup and gelation, but is not necessary for the chemical reaction as is the water. The amount of isopropyl alcohol which is used varies with the chain lengths of the alkyl groups on the amine and the alkoxy group of the halide, and also varies with the desired concentration of the final product. More alcohol is necessary to have a 50 percent by weight solution than a 33⅓ percent by weight solution.

The process involves the reaction of equivalent quantities of tertiary amine or hydrohalide and the alkoxy supplying reactant. It is readily apparent that the reactants may be employed in other desired ratios during the reaction and the excess subsequently removed. Preferably the mole ratio of the alkoxy reactant to amine is from 0.90 to 1.0 to 1 when the amine reactant contains a single tertiary nitrogen per molecule.

The method of the invention allows production of new quaternary ammonium salts including diquaternary salts having attached to each quaternized nitrogen a 2-hydroxy, 3-alkoxy propyl radical wherein the alkoxy group includes a $C_8$—$C_{18}$ hydrocarbon chain. Suitable ditertiary amine reactants include substituted piperazines and tetralkyl alkylene diamines such as tetramethylethylene diamine. These compounds are excellent emulsifying agents.

The present method also makes possible the synthesis of quaternary ammonium salts wherein the quaternized nitrogen is part of a heterocyclic ring system and has an attached 2-hydroxy, 3-alkoxy propyl radical. Such compounds include the reaction products of 1-halo, 2-hydroxy, 3-alkoxy propanes and N-alkyl morpholines, pyridine, substituted and unsubstituted piperazines, isoquinolines, quinolines, and pyrroles. These compounds are also excellent emulsifying agents. The following examples illustrate the invention.

EXAMPLE I

A. Two-hydroxy, 3-dodecoxypropyl dimethyl dodecyl ammonium chloride: Into a 1—1, 4-neck round bottom flask equipped with a motor driven stirrer, a reflux condenser, a thermometer, and dropping funnel, was weighed 140 g. (0.5 mole.) 1-chloro, 2-hydroxy, 3-dodecoxypropane and 107 g. (0.5 mole.) dodecyl dimethyl amine. The solvent, 205 cc. water and 42 cc. isopropyl alcohol, was added and the reaction mixture heated to reflux with rapid stirring. The alcohol was added initially with the water to avoid gel formation. After four hours of reflux, the reaction mixture became sufficiently homogeneous to clear and another 205 cc. $H_2O$ and 42 cc. isopropyl alcohol was added slowly through the dropping funnel. The temperature was never allowed to drop below 90° C. The reaction mixture was refluxed for two additional hours after all the solvent was added. The final product was a nearly clear homogeneous solution of 33⅓ percent concentration by w/v (33⅓ g. of product per 100 ml. of solution) which thickened somewhat on cooling. The product contained 11.3 percent alcohol by volume. This product reduced the interfacial tension of the benzene-water interface as well as the hexane-water interface to less than 0.1 dyne/cm. at concentrations as low as 0.0001 percent.

B. The procedure of "A" above was followed, except that no water was added as a solvent. Into a 250 ml. Erlenmeyer flask, fitted with an air-cooled condenser, was weighed 28 g. (0.1 mole) 1-chloro, 2-hydroxy, 3-dodecoxypropane and 21.4 g. (0.1 mole) dodecyldimethylamine. 25 cc. of isopropyl alcohol was added and no water was used in this run. The reaction media was heated to reflux and stirred by means of a hot plate-magnetic stirrer combination. Heating at reflux was continued for a total of 6 hours, after which the reactants were allowed to cool and the solvent removed by evaporation under reduced pressure. A small sample of the product when diluted with water formed an insoluble oil layer, and when it was vigorously shaken produced an emulsion with a very small amount of foam. A sample of the product was analyzed for oxirane oxygen and chloride ion. There was no apparent oxirane oxygen and the chloride ion analyzed 1.3 percent. Theoretical chloride ion for the quaternary product is 7.23 percent. Therefore, the reaction in the absence of water and for the same reaction time, as in example A was only 18 percent of theoretical.

A Fisher moisture determination was run on the isopropyl alcohol and established 0.5 water in the alcohol.

EXAMPLE II

Two-hydroxy, 3-decoxypropyl dimethyl dodecyl ammonium chloride: into a 500 ml. Erlenmeyer flask equipped with a reflux condenser was weighed 50.1 G. 1-chloro, 2-hydroxy, 3-decoxypropane and 42.6 g. dodecyl dimethyl amine. A magnetic stirring bar was placed in the flask and 83 cc. water was added. The reaction mixture was heated to reflux and stirred by means of a magnetic stirrer-hot plate combination. After 3 hours of refluxing, 10 cc. isopropyl alcohol was added and heating continued for 1 hour additional, at which time the reaction mixture was homogeneous. Within one half hour it began to thicken and gel. The slow addition of 113 cc. $H_2O$ and 10 cc. isopropyl alcohol lowered the viscosity and the reaction mixture remained fluid while refluxed an additional 1½ hours. The final product was a solution of 30 percent concentration, which solidified to a pastelike semisolid on several days standing.

By this same procedure we have synthesized the homologous series of all the compounds varying both alkyl chains.

EXAMPLE III

N-2-hydroxy, 3-dodecoxypropyl, N-methyl morpholinium chloride: Into a 1—1, 3-neck round bottom flask equipped with a reflux condenser, motor driven stirrer, and thermometer was weighed 139 g. 1-chloro, 2-hydroxy, 3-dodecoxypropane (0.5 mole.) and 48 g. N-methyl morpholine (0.475 mole.). The solvent, 157 cc. Water, was added and the reaction mixture heated to reflux. The reaction mixture was refluxed with constant stirring for two hours at which time the mixture became a homogeneous solution. The viscosity of the solution started to increase so 30 cc. of additional water and 20 cc. isopropyl alcohol was added to reduce the viscosity. After another hour of reflux, 100 cc. water was added followed by 60 cc. water and 7 cc. isopropyl alcohol one-half hours later. The reaction mixture was refluxed a total of 5 hours. The product was a 33⅓ percent concentration solution that was slightly cloudy and contained about 5 percent alcohol.

The amount of alcohol must be increased with an increase in the chain length in the homologous series in order to keep the viscosity low enough that the reaction mixture remains fluid. The reaction conditions will otherwise remain the same with variation of the alkoxy chain from $C_8$ to $C_{18}$.

EXAMPLE IV 1,2,4-trimethyl [1,4-(2-hydroxy, 3-dodecoxypropyl)] piperazonium dichloride: Into a 1—1, 3-neck round bottom flask equipped with a reflux condenser, motor driven stirrer, and thermometer was weighed 139 g. 1-chloro, 2-hydroxy, 3-dodecoxypropane (0.5 mole) and 30 g. 1,2,4,-trimethypiperazine (0.25 mole.) To this mixture was added 100 cc. $H_2O$ and the rapidly stirred reaction mixture was heated to reflux. After 2½ hours of reflux the mixture had become almost totally clear, and 69 cc. of water was added. The reaction mixture began to gel. Three increments of 169 cc. of water were added about 15 minutes apart. The reaction mixture was so gelled that refluxing was no longer possible since the material in the flask would climb the vessel walls when the temperature became too great. The temperature was therefore maintained at 80°–85° C. for about 7 hours. The final product was 20 percent concentration solution that had a jellylike consistency. If isopropyl alcohol were used at the initial addition of water, and at subsequent water additions, the gel problem would not have been encountered. The reaction conditions will otherwise remain the same with variation of the alkoxy chain from $C_8$ to $C_{18}$. The reaction can also be considered to remain the same with other variations of substituted and unsubstituted piperazines.

EXAMPLE V

N, N'-Bis (2-hydroxy,3-dodecoxypropyl) N,N,N',N'-tetramethyl ethylene diammonium dichloride: Into a 500 ml. Erlenmeyer flask equipped with an air cooled condenser was weighed 55.7 g. (0.2 mole) 1-chloro, 2-hydroxy, 3-dodecoxypropane and 11.6 g. (0.1 mole.) tetramethylethylene diamine. After the addition of 67 cc. water, the reaction mixture was heated to reflux with constant stirring by means of a hot plate-magnetic stirrer combination. Within one-half hour the heterogeneous reaction mixture cleared into a homogeneous solution, and within an hour the viscosity increased enough to cause the solution to gel. A second 67 cc. of water was added at this point followed by 20 cc. of isopropyl alcohol to reduce the viscosity and keep the mixture fluid. Refluxing was continued for two hours additional to give a clear solution which thickened somewhat on cooling.

This same procedure was used on the homologous series where the chain length of the alkoxy group on the 1-chloro, 2-hydroxy, 3-alkoxypropane varied from an eight carbon to an eighteen carbon atom chain inclusive.

EXAMPLE VI

A. A portion of 1-chloro, 2-hydroxy, 3-dodecoxy propane was weighed into a 1—1, 3-neck round bottom flask fitted with a motor driven stirrer and a reflux condenser. There was 139 g. (0.5 mole) of the above product, and 45 g. (0.45 mole) of triethyl amine was added. Stirring was started, and maintained throughout the reaction. To the reaction mixture was added 100 cc. of water. The reaction mixture was heated to reflux by means of a heating mantle. After 1½ hours of refluxing, the reaction mixture, which was heterogeneous previously, began to clear up. An additional 90 cc. of water was added at this time. After another 1½ hours, the reaction mixture was homogeneous. An additional 190 cc. of water was added and refluxing was continued for a final 1 hour. The product, 2-hydroxy, 3-dodecoxypropyl, triethyl ammonium chloride, formed a 33⅓ percent solution by w./v. This product reduced the interfacial tension of the benzene-water and the hexane-water interface to less than 0.1 dyne/cm. at concentration as low as 0.01 percent.

EXAMPLE VI

B. Several runs were made using 28 g. (0.1 mole) 1-chloro, 2-hydroxy, 3-dodecoxypropane and 10.1 g. (0.1 mole) triethylamine varying the amount of water in the solvent system. Isopropyl alcohol was used without any water added for run No. 1, then 5 percent of the alcohol was replaced with water in run No. 2, 10 percent in run No. 3, 20 percent in run No. 4, 30 percent in run No. 5, and 75 percent in run No. 6. Each run was in a 250 ml. Erlenmeyer flask fitted with an air cooled condenser. The flask was heated and the contents stirred by means of a hot plate-magnetic stirrer combination. The reaction was heated to reflux for a period of six hours, after which the solvent was removed by evaporation under reduced pressure and the product analyzed for oxirane oxygen and chloride ion. The procedure used for the analysis of oxirane oxygen in the presence of amines is that of Durbetaki, A. J., Anal. Chem., 30, 2024–5 (1958).

| Run | Percent $H_2O$ in solvent | Oxirane | Chloride | Chloride equivalent to oxirane | Chloride from quaternary formation |
|---|---|---|---|---|---|
| 1 | 0 | 1.1 | 1.97 | (2.44) | (¹) |
| 2 | 5 | 0.74 | 1.92 | 1.64 | 0.28 |
| 3 | 10 | 0.66 | 1.99 | 1.47 | 0.52 |
| 4 | 20 | 1.44 | 6.56 | 3.19 | 3.37 |
| 5 | 30 | 1.01 | 5.82 | 2.24 | 3.58 |
| 6 | 75 | 0.83 | 9.18 | 1.85 | 7.33 |

¹ Not enough chloride ion was detected to be equivalent to the amount of oxirane formed. It therefore seems other side reactions are occurring and apparently no quaternary amine was formed.

EXAMPLE VII

A portion of 1-bromo, 2-hydroxy, 3-dodecoxy propane was weighed into a 250 ml. Erlenmeyer flask, fitted with an air cooled condenser. There was 32.3 g. (0.1 mole) of the above product, and 10.1 g. (0.1 mole) of triethyl amine was added. Stirring was started, and maintained throughout the reaction. To the reaction mixture was added 34 g. of water and 8 g. isopropylalcohol. The reaction mixture was heated to reflux and stirred by means of a hot plate-magnetic stirrer combination. After 2 hours of refluxing, the reaction mixture, which was heterogeneous previously, began to clear up. Because the alcohol was added initially, there was no gelling or viscosity buildup so no additional solvent was added. After another 3 hours, the reaction mixture was homogeneous, and heating was discontinued. The product, 2-hydroxy, 3-dodecoxypropyl, triethyl ammonium bromide formed a 50 percent by weight solution.

EXAMPLE VIII

Triethylamine hydrochloride, made from triethylamine, and hydrogen chloride and recrystallized from acetone, 22.5 g. (0.164 mol), and 41.7 g. (circa 0.164 mol) of a mixture of glycidyl ethers (six to 18 carbons, 5.16 percent oxirane oxygen) were weighed into a 500 ml. Erlenmeyer flask fitted with an air cooled condenser. The solvent, 60 cc. water, was added and the flask heated to reflux while the contents were stirred by means of a hot plate-magnetic stirrer combination. After 3 hours of reflux, 4 cc. isopropyl alcohol was added and reflux continued over three/quarters of an hour. The product was left to stand overnight. The following morning 60 cc. of additional water and 4 cc. additional isopropyl alcohol was added and the solution refluxed one hour to give a clear homogeneous product that was 33⅓ percent solids, by weight/volume, that is 33⅓ grams of product per 100 ml. of solution.

EXAMPLE IX

The above procedure was followed for another glycidyl ether mixture (14 to 18 carbon atoms, 4.35 percent oxirane oxygen), except that 62.4 g. (circa 0.2 mol) of glycidyl ether and 27.5 g. (0.2 mol) triethylamine amine hydrochloride was used. Water (65 cc.) was added and the mixture refluxed and stirred for 2 hours before 20 cc. isopropyl alcohol was added. An additional 2½ hours of reflux was required before the solution became clear and homogeneous. An additional 65 cc. water and 20 cc. isopropyl alcohol was added and reflux continued for 1½ hours. A final 5 cc. water and 5 cc. isopropyl alcohol was added to bring the product to 33⅓ percent solids by weight/volume and the product allowed to cool. On cooling it solidified so an additional 65 cc. water and 25 cc. isopropyl alcohol was added to bring the solids to 25 percent. This dilution also solidified on cooling to a jellylike consistency.

EXAMPLE X

The same procedure was followed for another glycidyl ether mixture (six to 12 carbon atoms, 6.93 percent oxirane oxygen) except that 19 g. (circa 0.1 mol) of glycidyl ether and 14 g. (0.1 mol) triethylamine hydrochloride was used. The solvent was 30 cc. water. After 2¾ hours of reflux, there was a great deal of foam in the reaction vessel. An additional 30 cc. water was added and reflux continued for 1 hour before 6 cc. isopropyl alcohol was added. After a final 2 hours of reflux the product was a clear homogeneous solution of 33⅓ percent solids by weight/volume.

The three products discussed in VIII, IX and X above were analyzed for their surfactant ability. They were all surface active and showed properties similar to corresponding products synthesized from alkoxy chlorohydrins and triethylamine.

To obtain a rapid reaction rate it is desirable to have the reaction take place at a temperature above 75° C. The production of byproducts at temperatures above 100° C. as well as the necessity of a closed system makes use of these temperatures impractical. The preferred temperature range is from 80° to 100° C. Any convenient means for maintaining the desired temperature may be used such as a jacketed vessel or internal heat exchange coils.

Since the reaction takes place in the liquid phase, pressure is not an important factor in the reaction. Atmospheric, subatmospheric and superatmospheric pressures may be used. In many instances, it is convenient to reflux the solvent system.

Obviously many modifications and variations of the invention as hereinbefore set forth may be made without departing from the spirit and scope thereof, and therefore only such limitations should be imposed as are indicated in the appended claims.

We claim:

1. A method for the production of alkoxy-substituted quaternary ammonium salts comprising: reacting a tertiary amine with a 1-halo, 2-hydroxy, 3-alkoxy propane wherein the alkyl of the alkoxy group is a carbon chain of from about eight to about 18 carbon atoms, in the presence of water in an amount of greater than about 15 percent based upon the weight of the reactants.

2. The method of claim 1 wherein the reaction takes place at temperatures of from about 75° C. to about 100° C.

3. The method of claim 1 wherein the 1-halo, 2-hydroxy, 3-alkoxy propane is a 1-chloro propane.

4. The method of claim 1 wherein the tertiary amine is a benzyl tertiary amine.

5. The method of claim 1 wherein the tertiary amine is selected from the group consisting of trialkyl amines having one to four carbon atoms in the alkyl chains, trialkyl amines wherein at least one alkyl group has five to 22 carbon atoms, ditertiary amines and cyclic tertiary amines.

6. A method for the quaternization of tertiary amines with a 1-halo, 2-hydroxy, 3-alkoxy propane comprising: reacting in the liquid phase under reflux conditions, substantially stoichiometric amounts of a tertiary amine and a 1-halo, 2-hydroxy, 3-alkoxy propane wherein the alkyl of the alkoxy group is a carbon chain of from about eight to about 18 carbon atoms, in the presence of a solvent comprising 15–100 percent water and 0–85 percent isopropyl alcohol, said solvent being present in an amount of greater than about 15 percent based upon the weight of the reactants.

7. The method of claim 6 wherein the tertiary amine is selected from the group consisting of trialkyl amines having one to four carbon atoms in the alkyl chains, alkyl dimethyl amines wherein the alkyl group has five to 22 carbon atoms, aliphatic ditertiary amines, cyclic ditertiary amines and cyclic tertiary amines.

8. The method of claim 6 wherein the halogen substituent of the 1-halo, 2-hydroxy, 3-alkoxy propane is chlorine, and wherein said alkoxy propane is the reaction product of a 10–14 carbon fatty alcohol and epichlorohydrin.

* * * * *